United States Patent [19]

Weller

[11] Patent Number: 4,692,431

[45] Date of Patent: Sep. 8, 1987

[54] HYDROUS OXIDE ACTIVATED CHARCOAL

[75] Inventor: Joseph P. Weller, Lake Jackson, Tex.

[73] Assignee: The Dow Chemical Company, Midland, Mich.

[21] Appl. No.: 809,441

[22] Filed: Dec. 16, 1985

[51] Int. Cl.$^4$ .................. B01J 20/20; B01J 20/10; B01J 20/08; B01D 15/04

[52] U.S. Cl. .................................. 502/417; 210/679; 210/683; 210/690; 252/179; 252/182; 252/184; 502/182; 502/407; 502/415

[58] Field of Search ............... 502/11, 182, 416, 417, 502/407, 415; 252/179, 182

[56]  References Cited

U.S. PATENT DOCUMENTS

| | | | |
|---|---|---|---|
| 4,178,270 | 12/1979 | Fujita et al. | 502/182 |
| 4,362,626 | 12/1982 | Takeuchi et al. | 502/402 |
| 4,400,305 | 8/1983 | Takeuchi et al. | 502/402 |
| 4,405,574 | 9/1983 | Lee et al. | 423/157 |
| 4,405,576 | 9/1983 | Lee et al. | 423/181 |
| 4,415,677 | 11/1983 | Lee et al. | 521/28 |
| 4,415,678 | 11/1983 | Lee et al. | 521/28 |
| 4,418,043 | 11/1983 | Lehr et al. | 423/22 |

*Primary Examiner*—P. E. Konopka
*Attorney, Agent, or Firm*—C. M. Bell; W. J. Lee

[57] ABSTRACT

A method for producing a metal ion exchanger with increased absorption and regeneration capabilities that comprises treating an ionically inert porous support with a solution of metal oxychloride. Said metal oxychloride precipitates within the pores of the support and bonds thereto regardless of the pH of the system. The ion exchanger is then used as a medium through which sea water or other brine solutions are passed and inorganic ions and trace organics selectively absorbed. The ion exchanger is easily regenerated after absorption through treatment with sodium hydroxide and hydrochloric acid and can be reused immediately.

15 Claims, No Drawings

HYDROUS OXIDE ACTIVATED CHARCOAL

FIELD OF THE INVENTION

Ion exchange mechanisms have important applications in the areas of chemical processing and chemical analysis. The industrial applications include ion exchange chromatography, water softening and deionization, waste treatment and ion exchange chemical analyses. The process itself involves a reversible exchange of ions of the same charge sign between an aqueous solution and an insoluble solid in contact with it. A solid ion exchanger has an extended, open molecular framework that includes electrically charged ionic groups. A cation exchanger exchanges mobile positive ions and therefore has negative ions built into its framework. An anion exchanger involves the reverse. Fixed ions comprise the latticework of the molecule, while counter ions react with molecules of the solution to be purified. A dynamic equilibrium is created in which the mobile ion of the exchange molecule disassociates and bonds with the element in solution which likewise disassociates. The ion exchanger is generally amphoteric in nature and reacts as an acid or base depending upon the pH of the system.

BACKGROUND OF THE INVENTION

Hydrous oxides of metals from Group IV of the periodic table such as titanium and zirconium are well known inorganic ion exchangers. The metal hydrous oxides are also frequently referred to as metal hydroxides. They exist as microcrystalline environments of fixed ions and as such are highly selective, i.e. certain hydrous metal oxides or hydroxides will only react with particular elements. In the art the metal oxide or hydroxide is incorporated into a macroporous resin carrier molecule, usually an organic polymer. Historically, the problem with metal hydroxides in the ion exchange process is that they have very low mechanical strength. Heat treatment has been suggested as a means for increasing their strength. However, treatment with heat causes the hydroxyl groups to undergo condensation, thereby lowering the ion exchange capacity of the metal. By providing a method wherein a large amount of hydrous metal oxide can be firmly supported on a carrier molecule, the mechanical strength of the hydrous metal oxide is improved.

Carriers such as alumina gel, silica gel, activated carbon and macroporous strong cation resin-1 (Dow MSC-1) have shown success in the past for providing a substrate upon which hydrous metal oxides have been utilized in ion exchange processes. Bonding has been taught as being optimum, however, only where the hydrous metal oxide and the carrier possess opposite zeta potentials, i.e., opposite polarities so as to attract one another. This has always been found to depend on the pH of the system.

Hydrous zirconium oxide is selective for sulfate ($SO_4^=$) and borate ($BO_2^-$) ions. When bound to one of the aforementioned cationic resins (particularly commercially produced MSC-1), regeneration has been extremely difficult due to the presence of a sulfite ($SO_3^=$) ion exchange function within MSC-1. These systems after having reacted with the solution in question, have always required regeneration by treatment with an aqueous slurry of magnesium hydroxide $Mg(OH)_2$, followed by a water rinse and then treatment with dilute hydrochloric acid (HCl) to convert the exchange function to a chloride. If the cation exchange function within the resin could be eliminated, the hydrous metal oxide could be regenerated with aqueous sodium hydroxide (NaOH) instead of the aqueous magnesium hydroxide $Mg(OH)_2$. This regeneration is simplified because the cation exchange site in the MSC-1 is eliminated. That cation site would otherwise pick-up $Mg^{++}$ or $Ca^{++}$ or other alkaline earth metals and form insoluble hydroxides on regeneration with NaOH, KOH, etc.

Therefore, since the sulfate ($SO_4^=$) and borate ($BO_2^-$) removal abilities of the ion exchange mechanism are due to the hydrous metal oxide phase present therein, a substrate with no cation exchange capabilities would simplify the regeneration process. It has now been found that activated charcoal is such a substrate. Its success appears to be due to its ionically inert characteristics and its extensive pore structure. Its large surface area appears to facilitate maximum ion exchange and to increase the precipitation of hydrous metal oxide therein, giving high loadings of the hydrous metal oxide. A secondary value in the use of activated carbon was disclosed in the literature which indicates that activated carbon in and of itself has exhibited the ability to absorb sulfate ($SO_4^=$) ion. Binding between the metal oxide and the activated charcoal will be possible at a less restricted pH range than that known in the prior art.

SUMMARY OF THE INVENTION

The present invention provides a process for the preparation of an ion exchanger comprised of an ionically inert porous support which is treated with a solution of metal oxychloride. The hydrous metal oxychloride precipitates within the pores of the support at an alkaline pH and thereby becomes fixed as hydrous metal oxide. The ion exchange capabilities are enhanced, since both the metal oxide and the porous support exhibit absorptive characteristics. The ion exchanger can then be utilized to absorb both inorganic ions and trace organics from sea water or other brines, and regeneration is simplified over other systems.

DESCRIPTION OF THE INVENTION

Alumina gel, silica gel and activated carbon are suitable support systems for hydrous metal oxide ion exchangers. The problem has been attaching the metal oxide to the carrier. Known methods of attachment have required that the hydrous metal oxide and the carrier molecule possess opposite zeta potentials so as to attract each other and become attached. This has been found to be dependent upon the pH of the system in which the carrier-ion exchange molecule is formed.

This invention is a method for the preparation of an ion exchange medium that is not dependent upon the zeta potentials of the carrier molecule and ion exchanger system and yields improved results. The invention will absorb $SO_4^=$, $BO_2^-$, $MoO_4^=$, and organics from $MgCl_2$ brine and other brine systems. An additional improvement over the prior art lies in the fact that regeneration of the exchange system does not require the laborious treatment with $Mg(OH)_2$, $H_2O$, and HCl as does the regeneration of macroporous resins such as MSC-1 and the functionalized polymers of styrene and divinyl benzene.

Whereas zirconium is the preferred metal for use in the formation of the ion exchange medium, titanium will also provide a suitable ion exchanger. Activated charcoal is chosen as the preferred inert porous support because of its extensive pore structure and its additional affinity for $SO_4^=$. The method involves contacting activated charcoal granules with a concentrated zirconium oxychloride solution; the concentration may vary from about 30% to complete saturation. The mixture is stirred at approximately 65° C. for about one hour, then degassed under a vacuum so as to remove undesirable gases from the charcoal pores which may affect the bonding affinities of the zirconium and charcoal. This will insure maximum penetration of the solution into the carbon. The sample is then filtered to remove excess solution and air-dried.

The impregnated charcoal is then treated with ammonium hydroxide ($NH_4OH$) or a base selected from the alkali metal hydroxides such as potassium hydroxide (KOH) or sodium hydroxide (NaOH), etc. so as to yield a pH range in the system that facilitates hydrolysis and is above that wherein the hydrous oxide and support have opposite zeta potentials. Ammonium hydroxide is preferred. Upon treatment of the charcoal-zirconium oxychloride system for 10-15 minutes, hydrous zirconium oxide precipitates within the pores of the charcoal. The entire process of contacting the charcoal with the zirconium oxychloride solution followed by base is repeated approximately 2-3 times in order to insure maximum metal oxide penetration and deposition within the charcoal. This is then followed by repeated washings with $H_2O$.

The second feature of the invention is the process by which the ion exchange charcoal is used to purify cell feeds of magnesium chloride brine and other brines. For example, the brine or solution to be treated can be pumped through a column packed with the activated charcoal that has been impregnated with hydrous metal oxide. An additional benefit of the system appears to be the heightened absorption effect on $SO_4^=$ of activated charcoal; i.e., the presence of hydrous zirconium oxide ($ZrO(OH)_2$) when in proximity to the activated carbon is believed to enhance the $SO_4^=$ adsorption over that of either carbon or hydrous zirconium oxide separately.

After the system has been used to purify the brine solution in question, regeneration is required to remove sulfate ($SO_4^=$) and borate ($BO_2^-$) ions from the zirconinum-ion exchange system. This is carried out by treating the zirconium-charcoal carbon with sodium hydroxide (NaOH), water ($H_2O$) and hydrochloric acid (HCl). Regeneration is easy since the activated carbon has minimal cation exchange abilities.

The present invention will now be described in reference to the following specific examples. Such examples are presented for the purposes of illustration only, and shall not under any circumstances be deemed as limiting the present invention. In these examples, unless otherwise indicated, all percentages are by weight.

EXAMPLE I

Hydrous zirconium oxide in the preferred embodiment was first placed in the pores of activated charcoal so as to create an improved substance for the removal of sulfate ions ($SO_4^=$) from magnesium chloride solution ($MgCl_2$). It was speculated that the use of activated carbon as opposed to macroporous strong cation resin (MSC-1) would eliminate the interaction of the normal ion exchange sites, i.e., sulfite ion sites, that interfered previously using MSC-1 as a substrate.

A zirconium-oxychloride ($ZrOCl_2$) solution was prepared by mixing approximately 89 grams $ZrOCl_2$ crystals with about 111 ml $H_2O$ and heating at 65°±5° C. to form a solution. A 60-gram sample of coconut charcoal (Fischer Scientific Co., 50-200 mesh lot #6543) was added to the solution which was then stirred and heated at 65° C.±5° C. for 1 hour. The sample is then filtered through a coarse screen and air dried for one hour.

Concentrated ammonium hydroxide ($NH_4OH$) (≥30%) was then added to the zirconium oxychloride solution-charcoal mixture, thereby raising the pH of the system above 8. The mixture was stirred for 10-15 minutes, thereby precipitating hydrous zirconium oxide within the pores of the charcoal. The excess ammonium hydroxide solution was then filtered off and the sample washed repeatedly (2-3x) with water. As much as 13% by weight zirconium could be loaded into the charcoal by this method.

The sample of activated charcoal-hydrous zirconium hydroxide was then packed into a 120 cc column which was jacketed with a hot (65° C.) glycol circulation. Acidified $MgCl_2$ (pH 2) was passed through the column at 12 ml/min and sulfate ($SO_4^=$) borate ($BO_2^-$) and manganese ion were found to be removed from the system. Regeneration of the hydrous zirconium oxide-charcoal was then accomplished by the following treatment:

(a) 12 ml/min $H_2O$ wash to pH 7
(b) 12 ml/min 240 ml NaOH
(c) 12 ml/min 1200 cc $H_2O$
(d) 12 ml/min 120 ml 1.0 N. HCl After regeneration, the hydrous zirconium oxide/charcoal was ready to treat more brine with the utility to remove sulfate ($SO_4^=$), borate $BO_2^-$, and organic impurities in one step.

The invention was also tested on a magnesium chloride brine of a type used as the feed liquor to a magnesium eletrolytic cell. The feed liquor contained 36.33% $MgCl_2$ by weight based on total brine, and 0.89% NaCl, 12.1% $BO_2^-$ and 0.3211% $SO_4^=$ by weight based on the weight of $MgCl_2$. The activated carbon/zirconium hydrous oxide ion exchanger was prepared by the method described previously.

A 1-inch diameter column was filled with 120 cc of the above activated carbon/hydrous $ZrO_2$ system. About 600 cc of the above brine (pH about 2.0) was passed through the bed at about 0.1 bed volume per minute. Wash water was then passed through the column to flush out the brine, and the bed was regenerated with two bed volumes of 1.0 normal NaOH. The bed was again washed with water (10 bed volumes), and finally treated with 0.05 molar HCl until the pH was about 2.0.

The regenerated bed was heated to about 65° C. and flushed with water. The brine was then passed through the bed at a rate to provide samples about 18 cc in volume every 90 seconds. Samples were begun as soon as the effluent had a $MgCl_2$ content greater than 0.34 wt. percent.

The results obtained in this test are given in the following table:

| Sample | Analysis of Brine Liquor | | | |
|---|---|---|---|---|
| | % $MgCl_2$ | % NaCl | % $BO_2^-$ | % $SO_4^=$ |
| FEED | 36.33 | 0.89 | 121 | .3211 |
| 10 | 34.99 | 0.90 | 2.60 | .0044 |
| 15 | 35.04 | 1.10 | 3.50 | .0021 |
| 20 | 34.99 | 1.10 | 2.80 | .011 |
| 25 | 34.76 | 1.10 | 9.40 | .073 |
| 30 | 34.23 | 1.10 | 25.00 | .110 |

-continued

| Sample | Analysis of Brine Liquor | | | |
| --- | --- | --- | --- | --- |
| | % MgCl$_2$ | % NaCl | % BO$_2^-$ | % SO$_4^=$ |
| 35 | 34.56 | 0.98 | 42.00 | .185 |
| 40 | 34.04 | 0.97 | 59.00 | .247 |
| 45 | 34.99 | 0.90 | 72.00 | .259 |
| 50 | 34.80 | 1.00 | 32.00 | .165 |

The above data show that the regenerated activated charcoal/hydrous ZrO$_2$ system was very effective in removing both BO$_2^-$ and SO$_4^=$ ions from the MAG liquor. The sulfate ion was reduced from the feed level of about 3100 ppm to less than 200 ppm for two bed volumes of liquor. Sulfate breakthrough occurred from between two and five bed volumes. A plateau was reached after five bed volumes at about 2100 ppm which may be due to sulfate ion absorption by the activated carbon. The borate (BO$_2^-$) ion concentration was also reduced from a feed level of about 120 ppm to about 10 ppm (again on 100% basis) for about 2.6 bed volumes. The use of an activated carbon base also indicates that the system also removes organic materials.

Further modifications and alternative embodiments of the invention will be apparent within the view of this description to those skilled in the art. Accordingly, this description is to be considered as illustrative only and for the purpose of teaching those skilled in the art the manner of carrying out the invention. Various modifications may be made in the method. Applicant's intent is that all such modifications, alterations and variations which fall within the spirit and scope of the appended claims be embraced thereby.

What is claimed is:

1. A process for preparing of an ion exchanger, comprising:
    treating an ionically inert activated charcoal porous support with an aqueous solution of metal oxychloride selected from the group consisting of zirconium and titanium oxychlorides so as to impregnate the pores of said support with said solution;
    separating said treated support from excess metal oxychloride solution;
    converting said metal oxychloride to a hydrous metal oxide precipitate in the pores of said support at a pH above 8 and above the pH whereat the hydrous metal oxide and activated charcoal support have opposite zeta potentials and sufficient to hydrolyze said metal oxychloride.

2. The process of claim 1 wherein the metal oxychloride is comprises of zirconium oxychloride.

3. The process of claim 1 wherein the metal oxychloride is comprised of titanium oxychloride.

4. The process of claim 2 or 3 wherein the ionically inert carrier support system comprises granulated activated charcoal.

5. The process of claim 2 or 3 wherein said metal oxychloride is converted to said hydrous metal oxide by treatment with a base selected from a group consisting of ammonium hydroxide (NH$_4$OH) and the alkali metal hydroxides.

6. The process of claim 5 wherein said base is ammonium hydroxide (NH$_4$OH).

7. The process of claim 5 wherein said base is sodium hydroxide (NaOH).

8. The process of claim 2 or 3 wherein said inert porous activated charcoal following treatment with the metal oxychloride solution is degassed so as to insure maximum penetration of the metal oxychloride within said charcoal carrier.

9. A process for preparing an ion exchanger comprising treating activated charcoal with a metal oxychloride solution from the group consisting of zirconium and titanium oxychlorides and degassing said charcoal so as to insure maximum penetration of the metal oxychloride within said charcoal carrier and then treating said charcoal with ammonium hydroxide so as to precipitate said metal oxychloride within the pores of said charcoal as hydrous metal oxide at a pH above 8 and above the pH whereat the hydrous metal oxide and activated charcoal have opposite zeta potentials.

10. The process of claim 9 wherein said metal oxychloride is zirconium oxychloride.

11. The process of claim 9 wherein said metal oxychloride is titanium oxychloride.

12. The process of claim 9 wherein said degassing is carried out by the placing of the mixture under a vacuum.

13. A process for preparing an ion exchanger comprising:
    treating granulated activated charcoal with a concentrated solution of a metal oxychloride from the group consisting of zirconium and titanium oxychlorides.
    degassing said mixture; and
    treating the resultant mixture with a base selected from the group consisting of ammonium hydroxide and alkali metal hydroxides so as to precipitate said oxychloride within the pores of said activated carbon granules as hydrous metal oxide at a pH above 8 and above the pH whereat the hydrous metal oxide and activated charcoal have opposite zeta potentials.

14. The process of claim 13 wherein said metal oxychloride is zirconium oxychloride.

15. The process of claim 13 wherein said metal oxychloride is titanium oxychloride.

* * * * *